(12) United States Patent
Sherman (10) Patent No.: US 11,653,221 B2
(45) Date of Patent: May 16, 2023

(54) METHOD FOR CONTROL OF COGNITIVE LPE RADIO

(71) Applicant: BAE Systems Information and Electronic Systems Integration Inc., Nashua, NH (US)

(72) Inventor: Matthew J. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 553 days.

(21) Appl. No.: 16/804,104

(22) Filed: Feb. 28, 2020

(65) Prior Publication Data
US 2021/0274354 A1   Sep. 2, 2021

(51) Int. Cl.
*H04W 16/18* (2009.01)
*H04W 24/08* (2009.01)
*G06N 5/04* (2023.01)
*G06N 3/006* (2023.01)

(52) U.S. Cl.
CPC ............ *H04W 16/18* (2013.01); *G06N 3/006* (2013.01); *G06N 5/04* (2013.01); *H04W 24/08* (2013.01); *H04B 2201/692* (2013.01)

(58) Field of Classification Search
CPC ...... H04W 16/18; H04W 24/08; G06N 3/006; G06N 5/04; H04B 2201/692; H04B 7/18502; H04L 27/0006
See application file for complete search history.

(56) References Cited

U.S. PATENT DOCUMENTS

| | | | |
|---|---|---|---|
| 8,681,218 B1 | 3/2014 | Jensen et al. | |
| 8,976,837 B1 | 3/2015 | Lomp et al. | |
| 10,348,382 B1 | 7/2019 | Jensen | |
| 2009/0197548 A1 | 8/2009 | Kowalewski | |
| 2015/0180689 A1 | 6/2015 | Deriche et al. | |
| 2016/0068268 A1 | 3/2016 | Bookless et al. | |
| 2017/0012697 A1* | 1/2017 | Gong | G05D 1/0022 |
| 2017/0013413 A1* | 1/2017 | Singh | G05D 1/0011 |
| 2018/0191457 A1 | 7/2018 | Wang et al. | |

OTHER PUBLICATIONS

BAE Systems, Communiciations Under Extreme RF Spectrum Conditions, www.baesystems.com.
Haigh, et al., Parallel Learning and Decision Making for a Smart Embedded Communications Platform, Raytheon BBN Technologies, BBN Report-8579, 2015.
Haigh, Learning to Optimize a Network Overlay Router, Distribution Statement "A", Raytheon BBN Technologies, 2017.
Mody, et al., On Making the Current Military Radios Cognitive without Hardware of Firmware Modifications, BAE Systems, Technology Solutions, US Army Cerdec, S&TCD SEAMS.

(Continued)

*Primary Examiner* — Dinh Nguyen
(74) *Attorney, Agent, or Firm* — Sand, Sebolt & Wernow LPA; Gary McFaline (57) ABSTRACT

A system and method of cognitive radio control to allow for low probability of detection and/or low probability of exploitation communications in a contested or hostile environment. The cognitive radio system of the present disclosure can reason over policy constraints and real-time data to make dynamic changes to mission parameters in real-time.

14 Claims, 4 Drawing Sheets

(56) References Cited

OTHER PUBLICATIONS

Zeng, et al., From Spectrum Agility to Network Agility: Proactive and Adaptive Reconfiguration for Reliable Communiciation in Tactical Networks, Intelligent Automatic, Inc., BAE systems, US Army CERDEC.
International Search Report, PCT/US21/20029, dated Jan. 5, 2022, 11 pages.

* cited by examiner

METHOD FOR CONTROL OF COGNITIVE LPE RADIO

TECHNICAL FIELD

The present disclosure relates generally to low probability of exploitation (LPE) and low probability of detection (LPD) communications. More particularly, the present disclosure relates to the use of cognitive radio technology to allow for dynamically variable throughput and range based on the level of LPE/LPD desired. Specifically, the present disclosure relates to the development of dynamic policies and constraints to allow the cognitive radio to reason and to determine the dynamically variable throughput and range levels.

BACKGROUND

Radio communications, particularly those used in military operations taking place in contested or hostile environments, are often vital to the success of such operations. Such communications may be used locally, for example, to coordinate troop positions or movements as well as to relay and/or exfiltrate information out to a remote location such as a base of operations or command center. Each of these specific types of communications may have different requirements relating to power frequency or the like.

As these battlefield communications are vital, adversaries in the area of operations may look to exploit such communications to determine information about their opponent, such as troop location, movement and/or troop/vehicle type. Accordingly, it is desirable to utilize low probability of exploitation (LPE) and/or low probability of detection (LPD) communications to thwart such exploitation of the radio signal. As adversarial sensor capabilities have improved, these LPE/LPD technologies become more important; however, they typically come at the cost of reduced throughput, which may further impact mission effectiveness.

SUMMARY

The present disclosure addresses these and other issues by providing a system and method of cognitive radio control to allow for low probability of detection and/or low probability of exploitation communications in a contested or hostile environment. The cognitive radio system of the present disclosure can reason over policy constraints and real-time data to make dynamic changes to mission parameters in real-time.

In one aspect, an exemplary embodiment of the present disclosure may provide a cognitive radio system comprising: at least one antenna in operable communication with at least one transceiver, the at least one antenna and at least one transceiver operable to receive and transmit electromagnetic signals; and a processor in operable communication with the at least one transceiver, the processor operable to determine and place a set of constraints on the operation of the at least one transceiver and at least one antenna according to the location of cognitive radio system relative to a remote receiver; wherein the set of constraints further comprise at least one of a transmission power constraint, a transmission direction constraint, and a transmission location constraint and wherein the set of constraints is operable to prevent at least one of detection and exploitation of the cognitive radio system by the remote receiver. This exemplary embodiment or another exemplary embodiment may further provide at least one non-transitory computer readable storage medium having instructions encoded thereon that, when executed by the processor, implements operations to determine the set of constraints, the instructions comprising: identify at least one active receiver within a theater; determine a signal-to-noise ratio (SNR) wall specific to the at least one active receiver; calculate the spectral flux density (SFD) for the at least one active receiver; and determine at least one of the transmission power constraint, the transmission direction constraint, and the transmission location constraint relative to the SFD of the at least one active receiver. This exemplary embodiment or another exemplary embodiment may further provide wherein the instructions further comprise: determine a SNR wall specific to each of the at least one active receivers within the theater; calculate the SFD for each of the at least one active receivers within the theater; determine at least one of the transmission power constraint, the transmission direction constraint, and the transmission location constraint relative to the SFD of each of the at least one active receivers; and generate a mission plan using the at least one determined constraint for each of the at least one active receivers prior to initiating a mission into the theater. This exemplary embodiment or another exemplary embodiment may further provide wherein the processor determines each of the transmission power constraint, the transmission direction constraint, and the transmission location constraint for each of the at least one active receivers. This exemplary embodiment or another exemplary embodiment may further provide wherein the mission plan includes a mission path and at least one communications node. This exemplary embodiment or another exemplary embodiment may further provide wherein the instructions further comprise: generate a communications signal from a platform operating in the theater from the at least one communications node according to the at least one of the transmission power constraint, the transmission direction constraint, and the transmission location constraint. This exemplary embodiment or another exemplary embodiment may further provide wherein the instructions further comprise: modify at least one of the transmission power constraint, the transmission direction constraint, and the transmission location constraint for the at least one active receiver in real-time; and modify the mission plan in real-time according to the modification to at least one of the transmission power constraint, the transmission direction constraint, and the transmission location constraint for the at least one active receiver. This exemplary embodiment or another exemplary embodiment may further provide wherein the modification of the mission plan changes at least one of a mission path and at least one communications node.

In another aspect, an exemplary embodiment of the present disclosure may provide a method of secure communications within a contested environment comprising: identifying at least one active receiver within a theater; determining a signal-to-noise ratio (SNR) wall specific to the at least one active receiver; calculating the spectral flux density (SFD) for the at least one active receiver; determining at least one of the transmission power constraint, the transmission direction constraint, and the transmission location constraint relative to the SFD of the at least one active receiver prior to initiating a mission into the theater; initiating the mission into the theater; collecting data in real-time relating to the at least one active receiver; and modifying the mission in real-time according to the data collected. This exemplary embodiment or another exemplary embodiment may further provide determining each of the transmission power constraint, the transmission direction constraint, and the transmission location constraint relative to the SFD of the at least one active receiver. This exemplary embodiment or another exemplary embodiment may further provide re-calculating the SFD for the at least one active receiver according to the data collected; and re-determining the at least one of the transmission power constraint, the transmission direction constraint, and the transmission location constraint relative to the re-calculated SFD of the at least one active receiver. This exemplary embodiment or another exemplary embodiment may further provide determining a signal-to-noise ratio (SNR) wall specific to each of the at least one active receivers within the theater; calculating the spectral flux density (SFD) for each of the at least one active receivers; and determining at least one of the transmission power constraint, the transmission direction constraint, and the transmission location constraint relative to the SFD of each of the at least one active receivers prior to initiating the mission into the theater. This exemplary embodiment or another exemplary embodiment may further provide re-calculating the SFD for one or more of the at least one active receivers according to the data collected; and re-determining the at least one of the transmission power constraint, the transmission direction constraint, and the transmission location constraint relative to the re-calculated SFD of the one or more of the at least one active receivers. This exemplary embodiment or another exemplary embodiment may further provide generating a mission plan having a mission path and at least one communications node prior to initiating the mission. This exemplary embodiment or another exemplary embodiment may further provide wherein modifying the mission further comprises: modifying at least one of the mission path and at least one of the at least one communications node. This exemplary embodiment or another exemplary embodiment may further provide wherein modifying the mission further comprises: modifying both of the mission path and at least one of the at least one communications node. This exemplary embodiment or another exemplary embodiment may further provide generating a communications signal from a platform operating in the theater from the at least one communications node according to the at least one of the transmission power constraint, the transmission direction constraint, and the transmission location constraint. This exemplary embodiment or another exemplary embodiment may further provide wherein modifying the mission further comprises: re-calculating the SFD for the at least one active receiver according to the data collected; re-determining the at least one of the transmission power constraint, the transmission direction constraint, and the transmission location constraint relative to the re-calculated SFD of the at least one active receiver; and modifying the communications signal according to the at least one re-determined transmission power constraint, the transmission direction constraint, and the transmission location constraint.

In yet another aspect, an exemplary embodiment of the present disclosure may provide a cognitive radio comprising: at least one antenna in operable communication with at least one transceiver, the at least one antenna and at least one transceiver operable to receive and transmit electromagnetic signals; and a processor in operable communication with the at least one transceiver, the processor having a reasoner operable to determine and place a set of constraints on the operation of the at least one transceiver and at least one antenna according to the location of cognitive radio system relative to a remote receiver; wherein the set of constraints further comprise at least one of a transmission power constraint, a transmission direction constraint, and a transmission location constraint. This exemplary embodiment or another exemplary embodiment may further provide wherein the reasoner is further operable to modify the set of constraints in real-time.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
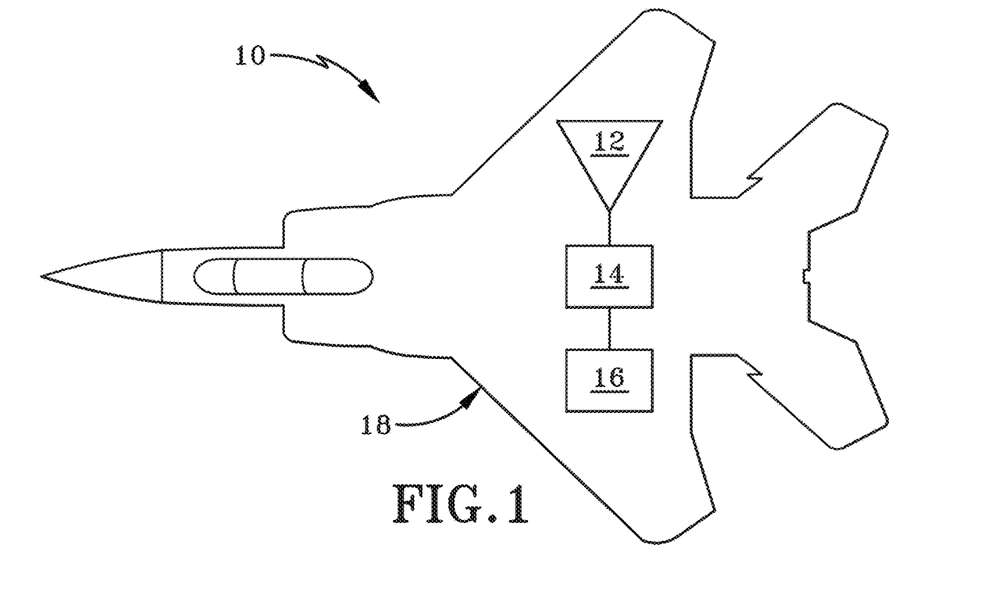
FIG. 1 is a schematic view of a cognitive radio system according to one aspect of the present disclosure.
Figure 3:
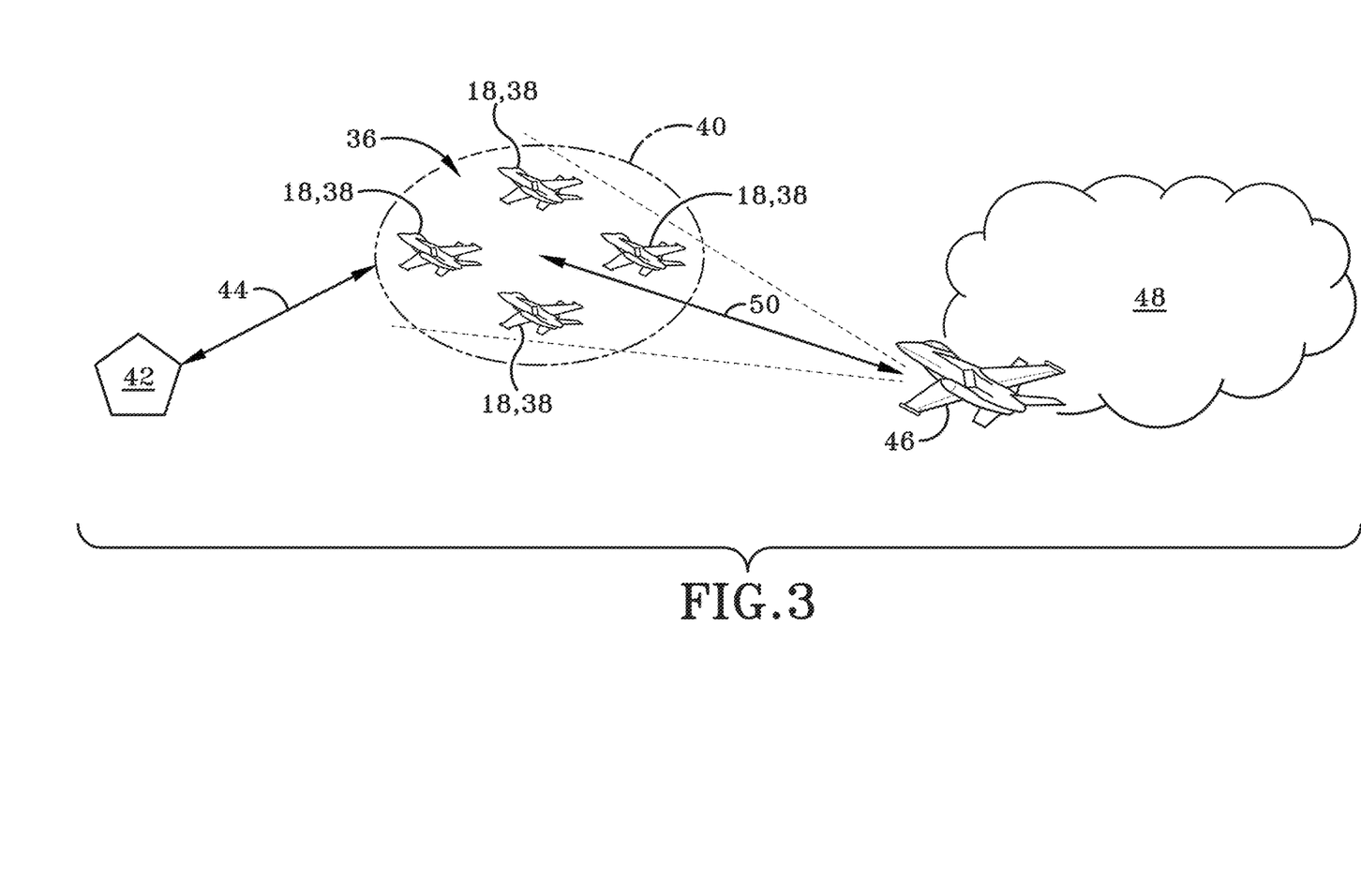
FIG. 3 is an operational view of a flight group utilizing a cognitive radio system according to one aspect of the present disclosure.

With reference to FIG. 1, a cognitive radio system is shown and generally indicated at reference 10. As shown in FIG. 1, a basic representation of cognitive radio system 10 may include one or more antennas 12, one or more transceivers 14, and one or more processors 16. As depicted in FIG. 3, cognitive radio system 10 may be installed on a platform 18, as discussed further herein.

As used and understood herein, antenna 12 may be an antenna array, which may include one or more antennas 12 in any configuration and may be installed in any position on platform 18. Antenna 12 may be a monopole, dipole or directional antenna (or antennas) 12, or may be any combination thereof. Antenna(s) 12 may be arranged in any desired configuration appropriate for the installation conditions, including existing legacy configurations on a platform 18 as dictated by the specific installation parameters and the type of platform 18 used. It will be understood that one particular antenna 12 arrangement may work better for a particular platform 18 with another antenna 12 arrangement being better suited for a different platform 18. By way of one non-limiting example, where platform 18 is an aircraft, it may be better suited for a particular antenna 12 arrangement(s) while a land-based or sea-based vehicle platform 18 may find advantages with a different antenna 12 arrangement(s).

Antenna(s) 12 may include receiving antennas and transmitting antennas, which may be operable to both broadcast and/or receive radio signals directed to and/or from the platform 18 as discussed further herein. According to one aspect, the antennas 12 may be in communication with transceiver 14 and/or processor 16 such that signals received by antennas 12 may be communicated to transceiver 14 and/or processor 16 as discussed further herein. Similarly, signals being generated by processor 16 and/or transceiver 14 may be communicated to and broadcast out from platform 18 via antennas 12. Where multiple antennas 12 are utilized, they may be configured such that all antennas 12 may be of the same type (e.g. dual band, directional, omni-directional, etc. . . . ) or may be configured such that multiple types of antennas 12 may be employed together or in close proximity with each other. According to one example, a cognitive radio system 10 may have one antenna 12 or antenna 12 set configured for a first signal, such as a dual band signal while also having antenna(s) 12 configured for a second signal, such as a directional signal.

The one or more transceivers 14 may be operable to both transmit and/or receive radio waves via the antennas 12 and may include any type of transmitter, including but not limited to, communications transmitters, radar transmitters, signal jamming transmitters, or the like. According to one aspect, transceiver 14 may include more than one type of transmitter. Transceiver 14 may further include any type of receiver, including but not limited to, radio receivers, global navigation receivers, very high frequency omni-directional range (VOR) receivers, or the like. According to another aspect, transceiver 14 may include more than one type of receiver.

Transceiver 14 may be operable to transmit and/or receive electromagnetic signals via the antennas 12, as discussed further herein. According to another aspect, transceiver 14 may be both a transmitter and a receiver realized as separate assets within the cognitive radio system 10 as dictated by the desired implementation parameters.

Transceiver 14 may be in communication with one or more processors 16 through a wired or wireless connection, which may be a direct connection, a direct serial connection, or a wireless connection. According to another aspect, transceiver 14 may be in communication with processor 16 through intermediate components that may be included or otherwise utilized by cognitive radio system 10 according to the desire implementation. For example, transceiver 14 may be in communication with processor 16 by way of one or more frequency converters or the like.

The one or more processors 16 may be one or more computer processors, logics or series of logics, including or otherwise in communication with one or more non-transitory storage mediums. The processor 16 may be a digital processor capable of carrying out and executing a set of instructions or processes encoded thereon as further discussed herein. According to one aspect, processor 16 may be operationally connected to other components of cognitive radio system 10 as discussed further herein. According to another aspect, processor 16 may be remote from other cognitive radio system 10 components and may be in wired, wireless, or in any suitable combination of wired and wireless communication therewith. The connectivity and communication between other cognitive radio system 10 components and processor 16 may therefore vary, depending upon the desired implementation and installation parameters of cognitive radio system 10 as discussed herein.

Transceiver 14 and/or processor 16 may further be in communication with other systems onboard the platform 18 such that relevant data may be communicated there between. For example, where platform 18 is an aircraft, onboard flight systems may relay the data to the transceiver 14 and/or processor 16 such as heading, altitude, flight speed, geolocation and the like. Similarly, transceiver 14 and/or processor 16 may communicate data regarding detected signals and the like to the platform 18, including to the operator or operators thereof. As discussed further below, communication between the platform 18 and the cognitive radio system 10 may allow specific actions to be taken by platform 18. For example, where platform 18 is an unmanned aircraft such as a drone, platform 18 may take automated actions such as steering towards or away from a specific location to best fit the needs of cognitive radio system 10 and any communications being sent therefrom or received thereto. Where platform 18 is a manned platform, such as a manned aircraft, platform 18 may take similar automated responsive action or may alternatively allow the operator or pilot of the platform 18 to choose whether or not to employ responsive actions.

According to one aspect, transceiver 14 and processor 16 may be separate assets within cognitive radio system 10. According to another aspect, transceiver 14 and processor 16 may be a single, integrated unit within cognitive radio system 10. It will be therefore understood that the illustration of cognitive radio system 10 as shown in FIG. 1 is an exemplary view and not a limiting view thereof.

Platform 18 may be any unit operating in a congested environment, a contested environment, or a hostile environment that is capable of utilizing radio communications. According to one aspect, platform 18 may include manned portable cognitive radio systems 10 carried by individual troops. According to another aspect, platform 18 may be ground vehicles, sea-based vehicles, aircraft, including manned and unmanned, and the like carrying cognitive radio system 10 thereon or therewith. According to another aspect, platform 18 may be a munition, rocket, or other propelled vehicle. According to another aspect, platform 18 may be a remotely operated vehicle. As used herein, platform 18 is illustrated as a manned aircraft (such as aircraft 38); however, the examples and description provided herein will be understood to be equally applicable across all versions of platform 18 as dictated by the desired implementation, unless specifically stated otherwise.

As used herein, a congested environment is contemplated to be an environment with a high utilization of the electromagnetic spectrum and may include civilian areas or areas that are not considered to include a threat. A contested environment is contemplated to be an environment where opposing forces are operating, scanning, monitoring or otherwise present within an area of operations. A hostile environment, as used herein, is contemplated to be an environment that is contested in a manner such that a threat is posed to platform 18 as it operates in the area of operations. Accordingly, a hostile environment is a contested environment; however, a contested environment may not always be hostile. Both contested and hostile environments may be congested or not congested depending upon the utilization of the electromagnetic spectrum therein.

The area of operations may be referred to herein and collectively as the "theater" (such as theater 52, discussed further below) and will be understood to include both contested and hostile environments, unless specifically stated otherwise. An enemy or enemy unit, as used herein, is contemplated to be any member or unit of an opposing force operating in the same environment, including, but not limited to persons, vehicles, stationary installations, satellites, or the like.

Figure 2:
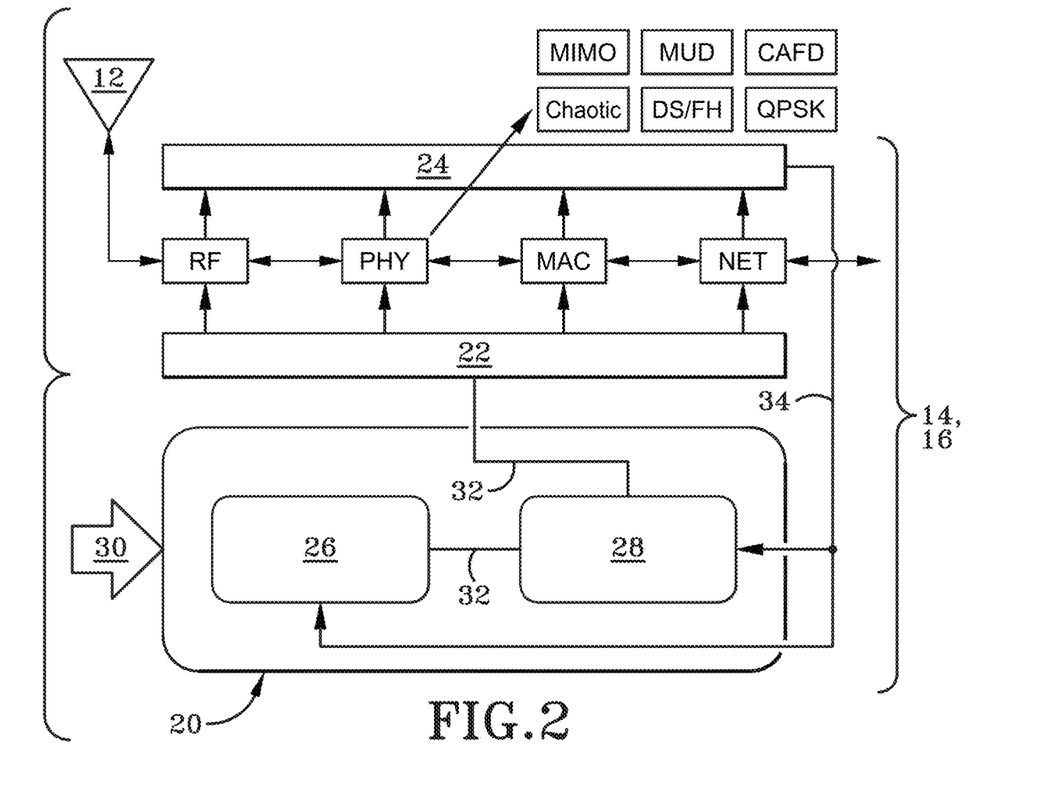
FIG. 2 is a block diagram view of a cognitive radio system according to one aspect of the present disclosure.

With reference to FIG. 2, the architecture of one embodiment of a cognitive radio system 10 according to the present disclosure is shown having a strategy optimizer component 20, a mitigation control plan component 22, and an interference recognizer component 24 which are shown as part of a block diagram relating to processor 16 and/or transceiver 14, as discussed herein. While each of these components, namely, strategy optimizer 20, mitigation control plan component 22 and interference recognizer 24 may vary depending upon the desired implementation, they will be understood to be described herein with reference to one embodiment and not as a limiting example of cognitive radio system 10 inasmuch as other components may be utilized or omitted as dictated by the desired implementation.

Strategy optimizing component 20 (also referred to herein as strategy optimizer 20) may further include a long term response engine 26 and a rapid response engine 28, which may be in communication with one another via one or more data connections, depicted at reference 32 in FIG. 2, to allow strategies to be developed both utilizing long term data and utilizing time data collected during operation and use of radio system 10 as discussed further herein. Strategy optimizer 20, or more specifically, long term and short term response engines 26, 28 may be further connected to the mitigation control plan component 22 through one or more data connections 32. Both long term response engine 26 and rapid response engine 28 may be further connected to interference recognizer 24 by a performance feedback loop 34, which may further facilitate real time adjustments or modifications to the cognitive radio system 10 as discussed further herein.

A variety of strategy optimizing components 20 can be used with this invention. The long term and short term response engines 26, 28 may be existing designs that may be adapted for use in strategy optimizing component 20. According to another aspect, long term and short term response engines 26, 28 may be adapted from existing designs or may be designed and built for a specific implementation, according to the desired parameters of such an implementation.

According to another aspect, other forms of machine intelligence including, but not limited to, a simple state machine such as in could also be used in place of the strategy optimizer 20, or in place of specific components thereof. By way of one non-limiting example, as discussed further herein, a set of computations to determine allowed power transmission based on policy 30 and observables, such as the current location of platform 18, may be applied. This policy 30 may be based on known link length, for example, and an allowed data rate could be determined and applied with a simple state machine, or the like.

Strategy optimizer 20 may further include a strong policy component indicated by the arrow at reference 30 that oversees or otherwise places proper limitations on the strategies and responses produced and utilized by cognitive radio system 10, as discussed below, to minimize the probability of detection, exploitation, or the like of system 10.

Strategy optimizer 20, or more particularly, long term and short term response engines 26, 28, may accept "observables" as provided by the interference recognizer 24 and interface to "controllables" such as provided by the mitigation component 22 to improve overall performance of the system 10, as discussed further herein.

As mentioned previously herein, it will be understood that the architecture of system 10 as depicted in FIG. 2 may be modified according to the desired implementation; however, the architecture may also operate similarly to legacy systems in that various components provided therein, including one or more of strategy optimizer 20, mitigation control plan component 22 and/or interference recognizer 24 may be legacy assets and/or may be used in connection with other legacy assets as dictated by the desired implementation.

Having thus described the elements and components of an exemplary cognitive radio system 10, the operation and methods of use therefor will now be described.

The strategy optimizing component 20 may be utilized as a reasoner utilizing game theory to allow cognitive radio system 10 to reason over a set of constraints as compared to the data collected by system 10 during operation. These constraints are illustrated as the policy component 30 and are constraints placed on the system 10 prior to operation to maximize the ability of the system 10 to be operated in a contested or hostile environment without being detected or located as discussed herein. The reasoner, aka strategy optimizing component 20, may then be operable to determine or figure out what the cognitive radio system 10 should be doing in any given scenario or situation. A few non-limiting examples of actions undertaken by cognitive radio system 10 include determinations of which frequency bands to utilize relative to time, placement, and/or direction of the transmission of data, including communications data in contested or hostile environments. For example, as discussed further herein, a cognitive radio system 10 carried by a platform 18 operating in range of an enemy receiver (such as enemy receivers 42, discussed below) may adjust the frequency or timing of a communications signal sent to another unit based on the presence of that enemy receiver to avoid detection or exploitation of that communications signal.

As cognitive radio system 10 includes a reasoner or component that operates to reason over the data, e.g. think for itself, the question then turns to a matter of control of system 10. In other words, there are constraints needed to prevent the reasoning component, such as strategy optimizer component 20, from overthinking or over-analyzing a particular situation.

There are many instances and scenarios in which a radio or communications equipment may be desirable to be operated in any environment, including contested or hostile environments. One such non-limiting example involves battlefield communication and/or coordination of units in a hostile environment. Accordingly, while it is understood that there are multiple applications for a system such as cognitive radio system 10 as described herein, the disclosure herein will be directed to such scenarios involving battlefield communications for the express purpose of simplicity and clarity in the disclosure. It will be therefore further understood that these are not limiting examples of use and operation of cognitive radio system 10 but exemplary operations and use thereof.

Thus, when used in battlefield communications, radio signals may be exploited by an enemy in a number of ways. First, radio signals may be detected by an enemy receiver and may be utilized to determine information as basic as the existence of units operating in a certain area or theater 52, to more complicated information as to the type, size, direction, heading, velocity, and/or current location of these communicating units. Further, even secured communications run the risk of being intercepted if the signals are not also hidden or otherwise made difficult to detect or exploit in the first place.

Therefore, it is desirable to maintain these communications in a manner that provides a low probability of detection and/or exploitation depending upon the desired level of secrecy needed in that particular operation and/or for that particular unit. Despite the fact that enemies may be able to detect and/or utilize and exploit electromagnetic signals such as radio waves to their advantage, radio silence in a contested or hostile environment such as a battlefield is often unfeasible as there are certain information exchange requirements ("IER(s)") that must be communicated amongst units operating therein. For example, these IERs may include such information as targeting, information regarding friendly force location (otherwise known as or referred to herein as blue force tracking), battle plans, action changes or reactive maneuvers, recon information, and the like. Often this involves two levels of communication. For example, a group of soldiers operating in a hostile area may be close together and thus may not require much bandwidth or power to talk amongst themselves, but there is a need to effectively communicate as a group to other units or persons who may be located further away, such as battlefield control or a mission commander. These remote units/persons may be located many miles or more from the troops operating and communicating the in theater 52. Communications to that effect require much higher power and increased bandwidth. By way of a simplified and non-limiting example, two individuals next to each other may communicate effectively by whispering, but to communicate with a person on the other side of a large field, they may need to shout. Relating this example to radio communications, the greater the distance separating the communicating parties, the "louder" the parties need to talk to effectively communicate.

With reference to FIG. 3, an illustrated example of battlefield communications using aircraft is shown and will now be described. Specifically, there may be a flight group 36 consisting of one or more aircraft illustrated at reference number 38. While illustrated as an aircraft 38, it will be understood that this could equally apply across any platform 18 as discussed previously herein. The aircraft 38 in flight group 36 may have a need to communicate amongst themselves for such objectives as blue force tracking, targeting, recon, evasive maneuvers, or the like as depicted in FIG. 3 by the circle surroundings flight group 36 and indicated as local communication zone 40, the local communications zone 40 may be relatively small compared to flight group 36. As flight group 36 operates in a theater 52 of operations, enemy receivers may be online such as radar installations, enemy units or vehicles, enemy aircraft, anti-aircraft batteries or other similar units. These units/receivers are collectively and generally indicated at reference 42 as seen in FIG. 3. These enemy receivers 42 may be monitoring or otherwise scanning for electromagnetic signals such as radio signals or communications signals that may help them locate or otherwise detect flight group 36 and/or the individual units, such as aircraft 38, contained therein.

As flight group 36 is operating in the direct theater 52, there may be a particular range at which enemy receivers are effective that may be infiltrated by flight group 36. This range is known as a range to intercept, or Ri, and is indicated by Arrow 44 in FIG. 3. This range is important to a unit operating in the theater 52, such as flight group 36, as operations within this range may allow for enemy detection or exploitation of any communication signals transmitted while operating within the Ri 44. Thus, any communications transmitted by or between aircraft 38 of flight group 36, including in local communication zone 40, may be susceptible to enemy detection.

Flight group 36 may also have a need to communicate with remote units such as a trailing aircraft, shown herein as aircraft 46, which may be a command unit or other similar unit. According to one aspect, trailing aircraft 46 may be of the same type as aircraft 38 and may represent one or more aircraft in a second flight group (not shown). According to another aspect, trailing aircraft 46 may be a troop transport or a different type of aircraft in transit to the theater 52 of operations. Typically, trailing aircraft 46 as illustrated herein may be several miles or more away from flight group 36 and/or the area of operations and is therefore not contained or otherwise operating within the Ri 44 of enemy receivers 42.

Trailing aircraft 46 may also be directly connected to other remote units such as a remote command center or installation, as well as other mobile units that may be travelling to or from the theater 52 of operations or may be operating outside of the theater 52 of operations. Communications between trailing aircraft 46 and all other units not currently operating within the theater 52 of operations may be generally referenced as the combat cloud as indicated in FIG. 3 by reference 48. This combat cloud 48 may allow for free exchange of data and other communications between units that are outside of the Ri 44 of enemy emitters 42.

Accordingly, trailing aircraft 46 may serve as the communications link between flight group 36, its individual members such as aircraft 38, and the combat cloud 48. However, as these units are operating at a greater distance, the communications range between flight group 36 and trailing aircraft 46 may require a much higher bandwidth or power to the signal, making that particular communications more susceptible to detection and/or exploitation by enemy receivers 42. This range of communication, or Rc, may then be an exposed relay; i.e., a communication that is exposed to possible detection. This exposed relay is indicated by the Arrow at reference 50 in FIG. 3.

Current solutions to tactical communications in contested or hostile environments tend to involve curtailing of communications, which comes at the cost of reduced throughput, which then may impact the mission effectiveness. Other such solutions can involve jamming or intentionally adding congestion or interference into the environment, which may be ineffective because enemy receivers such as receivers 42 often do not emit or transmit any signal and instead just monitor or "listen" for transmissions from other units; meaning these receivers 42 may not be affected by jamming signals or interference. Further, adding additional interference and congestion into an environment may have the adverse effect of interfering or congesting with your own signals thereby lowering the efficiency of your own communications. Additionally, as technological improvement to receivers 42 advance, the ability to detect the presence of a threat or other signals become limited, as well, and real-time or dynamic adjustments to the mission plans become more difficult.

Utilizing a cognitive radio system such as cognitive radio system 10 in these scenarios may allow the cognitive radio 10 to dynamically trade throughput for low probability of exploitation and low probability of detection. The present disclosure addresses ways of expressing low probability of exploitation/low probability of detection constraints, i.e. policy component 30, so that a cognitive radio system 10 can reason over these restraints. One such set of dynamic policies 30 can involve the use of spectral flux density (SFD) limits to allow cognitive radio system 10 to derive signal-to-noise ratio (SNR) walls to allow a low probability of detection to be maintained or low probability of exploitation to be utilized.

According to one aspect, the focus on the policy 30 is a key component of the system 10. These policies 30 may act as additional observables to the strategy optimizer 20 which may allow the long term and short term response engines 26, 28 to account for threats such as RF sensors that cannot normally be observed. These policies 30 could be static or dynamic.

At startup, the policy 30 would be to presume the existence of one or more receivers 42 at a given set of locations which may allow the strategy optimizer 20 to optimize the system 10 given those constraints as observables. Similarly, a new receiver 42 may be observed or detected and the presence of that receiver may be entered as a new policy 30 constraint during operation of the system 10, causing the system to re-optimize its configuration given the presence of that receiver 42. By way of one non-limiting example, an operator could observe a new airborne threat, such as an enemy aircraft, and enter the presence of that aircraft as a new policy 30 constraint during operation of the system 10. System 10, utilizing the strategy optimizer 20, may then change its configuration to account for, and minimize the detection or exploitation by, that aircraft, while still observing the previous policy 30 constraints. As discussed previously herein, other forms of machine intelligence could also be used to determine or adjust one or more constraints based on policy 30 and observables.

Prior to a mission, such as a flight group 36 being sent into a theater, intelligence may be gathered about various receivers 42, threats, and the like operating in the theater. Modern threats have come online that have much higher detection capabilities that, when integrated long enough, can generally detect almost any signal. More particularly, these advances receivers 42 can be integrated long enough to detect any signal above that particular receiver's 42 noise floor. With knowledge of what units and types of receivers 42 are being operated within a particular theater, this SNR wall can be calculated and reduced to a required SNR level, which may then function as an SNR wall. This SNR wall is a point below which communication signals can be "hidden" from that receiver 42 to maintain a low probability of detection or low probability of exploitation. Put another way, uncertainty in the noise floor for each receiver 42 can be assumed, which can then allow a signal to be designed that cannot be detected by that particular receiver 42.

By using information gathered in previous missions or through other intelligence means, the threat within the area of operations may be determined prior to a mission and with that information the SNR wall may be determined for each threat/receiver 42 operating in the theater. Further, information about any one particular receiver 42 may be gathered relating to the SNR wall, as well as to the receiver's 42 noise figure, and the receiver's 42 antenna gain, and may collectively be used to mask or hide a signal, as discussed further herein.

Each of these pieces of information about any one particular receiver 42 may be constrained by the specific area on which the threat operates. For example, a ship receiver 42 operating in open water may have a different noise figure or antenna gain than a ship operating in port. Similarly, ground-based threats or receivers 42 may have different constraints than air or land-based threats, while threats or receivers 42 on an island may have different restraints than threats or receivers 42 on or in a mainland facility.

Once the SNR that the receiver 42 requires to detect or signal, the receiver's 42 noise figure, and the receiver's 42 antenna gain are obtained, the spectral flux density (SFD) for each particular receiver 42 may be calculated. The SFD essentially stands for the power density that may be used for communications without being detected by each receiver 42. In other words, SNR walls, noise, and antenna gain can be translated into SFD limits within specific geographic areas such as zones 54, discussed below. Given those SFD limits, cognitive radio system 10 may derive power constraints for emissions in specific geographical locations and/or specific directions. For example, a low probability of detection signal may be used to coordinate links with other platforms 18 such as other aircraft 38 of flight group 36 within a local communications area 40. Similarly, higher rate communications based with a low probability of exploitation power constraint for each individual platform 18, such as aircraft 38, may be used to communicate over a greater distance, such as to trailing aircraft 46 or the combat cloud 48. By transmitting these higher data rate communications less often, and for shorter durations, while further accounting for the location of both the platform 18 and enemy receivers 42 allows for a lower probability of detection and exploitation of these signals while maintaining a high throughput and without curtailing battlefield communications.

In an area with multiple threats, the SFDs may vary, depending upon the particulars of each individual receiver 42. With these SFDs calculated for each particular receiver 42, a mission map of SFDs for each threat may be generated, which may be used to control emissions and communications so that none of the receivers 42 may detect your communication signals while operating in the theater. This mission map represents a set of constraints on cognitive radio system 10 representing maximum power levels of emissions in each area or within the RI of each individual receiver 42.

Figure 4A:
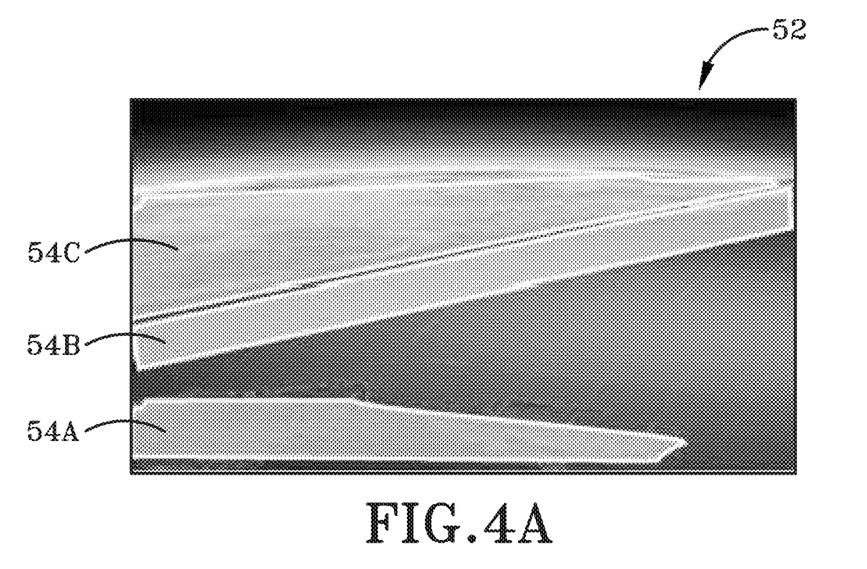
FIG. 4A is an operational view of an area of operations ("theater") showing different zones corresponding to different requirements for a cognitive radio system according to one aspect of the present disclosure.
Figure 4B:
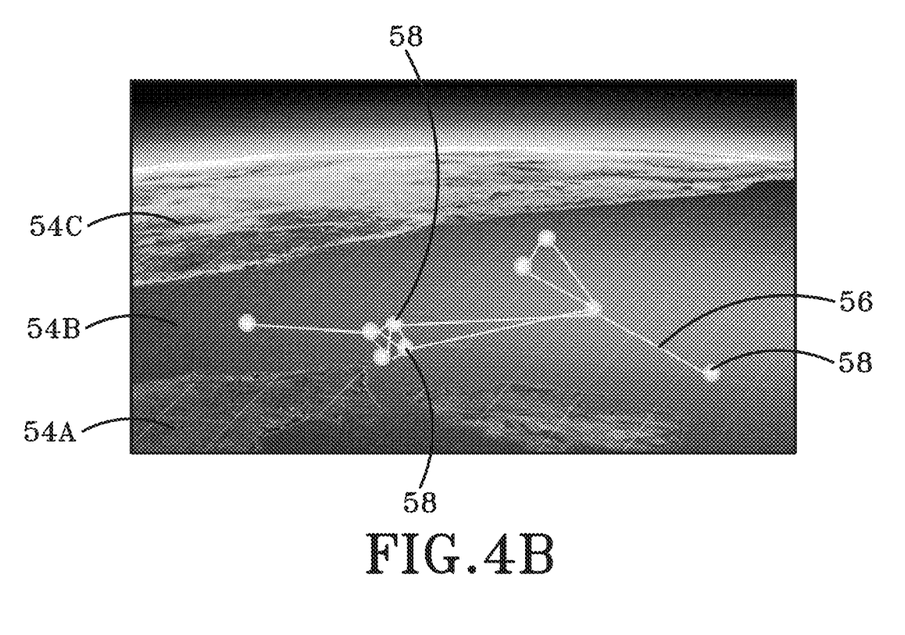
FIG. 4B is an operational view of the theater of FIG. 4A showing a mission path and communications nodes corresponding to different requirements for a cognitive radio system according to one aspect of the present disclosure.

With reference to FIG. 4A and FIG. 4B, an exemplary theater 52 of operations is shown and may be divided into various zones 54, which may represent different SFD constraints. As shown in FIG. 4A, a first area or zone 54A may represent a first SFD constraint and may represent receivers' threats and receivers 42 on an island or peninsula-type geographical area. A second zone 54B may represent a second SFD constraint such as those associated with a coastal zone. A third zone 54C may have a third SFD constraint associated with receivers 42 located on a mainland area. Each of these zones 54A, B, and/or C may further represent a set of spectrum policies that may be provided as a part of the initial mission planning policies, such as policies 30, which may provide a set of transmission power constraints for each zone 54A, B and/or C that cognitive radio system 10 must obey. These constraints may represent SNR noise floors for known receivers 42 within each of these zones 54 or alternatively, each of these constraints may be generalized over the entire zone. According to one non-limiting example, one such constraint may be a maximum transmission power constraint for any transmissions within a certain zone, such as zone 54A.

According to another aspect, these constraints may be service-specific. For example, local coordination communications may have different constraints than longer distance communications, such as exposed relay communications 50 to a trailing aircraft 46 and/or the combat cloud 48.

Cognitive radio system 10 may utilize these spectrum policies for each zone 54 to optimize network and link configurations and account for special transmission techniques such as MUD, MU-MIMO, etc. Cognitive radio system 10 may use these constraints to further plan or prepare a mission. According to one non-limiting example, a mission path (shown in FIG. 4B at reference 56—representing therein a flight path 56) for flight group 36 may be determined based on movement in and out of zones 54A-C (or for transmissions moving into or through zones 54A-C). Although shown in FIG. 4B as a flight path 56, it will be understood that mission path 56 may be applicable to any type of platform 18, including land-based, aircraft, or sea-based vehicles, or any other suitable platform 18. As used herein, for the purpose of clarity and simplicity, mission path 56 will be referred to as flight path 56 in accordance with the example of FIG. 3 wherein the platforms 18 are aircraft 38 of flight group 36.

Cognitive radio system 10 may further determine or identify nodes, such as communications nodes 58, where communications may be less restrictive or less restrained without being detected by enemy receivers 42 or with minimal probability of detection and/or exploitation. These nodes may represent individual geographic points within flight path 56 or alternatively may represent particular points where certain communications may have the lowest probability of detection and/or exploitation. Nodes 58 may have different constraints based on the zone 54 in which they are situated, closest to, or the zones 54 in the direction of the desired transmissions. For example, if a node 58 is located within first zone 54A, it may have a specific zone related constraint, while a node 58 not located within any zone 54 may be unrestricted. Similarly, a node 58 that is outside of a restricted zone 54 but is transmitting in a direction that carries that transmission into or through a zone 54 may have the same restrictions as a node 54 located within that zone 54. Nodes 58 may have different policy 30 constraints, even if they are located within the same zone 54, as the constraints may be based on the receivers 42 present and online in a given zone 54 and/or in the immediate vicinity of a particular node 58. As discussed further below, these constraints may be dynamic in that they may be updated, amended, modified, or canceled in real-time during the course of a mission.

It will therefore be further understood that the specific constraints (such as SFD constraints) or limits in zones 54 may vary depending upon the particular mission needs, as well as upon factors relating to what level of detection and/or exploitation is acceptable. According to one non-limiting example, if knowledge of the presence of the platform 18, such as aircraft 38, operating within the theater 52 is permitted, a different constraint may be placed on communications than if detection of the platform 18 is desirable to be outright denied. Each node 58 may provide an achievable performance at a given standoff and data rate, which may substantially improve the probability of detection while providing higher data rates and communications. This is further enhanced when utilizing a relay, such as with trailing aircraft 46, to communicate between local units within the local communications area 40 and the combat cloud 48, as discussed previously herein.

In addition to prior mission planning, cognitive radio system 10, having a policy component 30 overseeing operations thereof and providing constraints thereto, can reason over these constraints in real-time when presented with new information regarding the theater 52 and/or activities contained therein. For example, where zone 54A contains a certain known threat or receiver 42, a pre-mission plan may be determined allowing a first level of transmission power to be utilized while operating in the first zone 54A; however, as an aircraft 38 moves into or near zone 54A, a new receiver 42 may come online that was previously unknown or undetected, which may limit or otherwise change communications abilities. Cognitive radio system 10 may reason over the constraint to modify or otherwise adjust communications and transmission protocols to account for the new threat from the new receiver 42.

Implementing a strong policy component 30 into a cognitive radio system 10 as described herein can allow a unit or platform 18, such as an aircraft 38 operating in a contested or hostile environment, to deal with contested and congested spectral maneuvering space. This may allow cognitive radio system 10 to operate at lower rates in the local communications area 40, thus reducing the probability of being detected or exploited, while reserving higher data rates for specific communications, for example, communications with trailing aircraft 46, which may be broadcast directionally or in specific geographic locations (such as at nodes 58) to maintain the low probability of detection and/or exploitation of such a signal. Thus, mission performance may be optimized while maintaining a low probability of detection and/or exploitation mission constraints. In other words, communications within a contested or hostile environment may be made secure.

Figure 5:
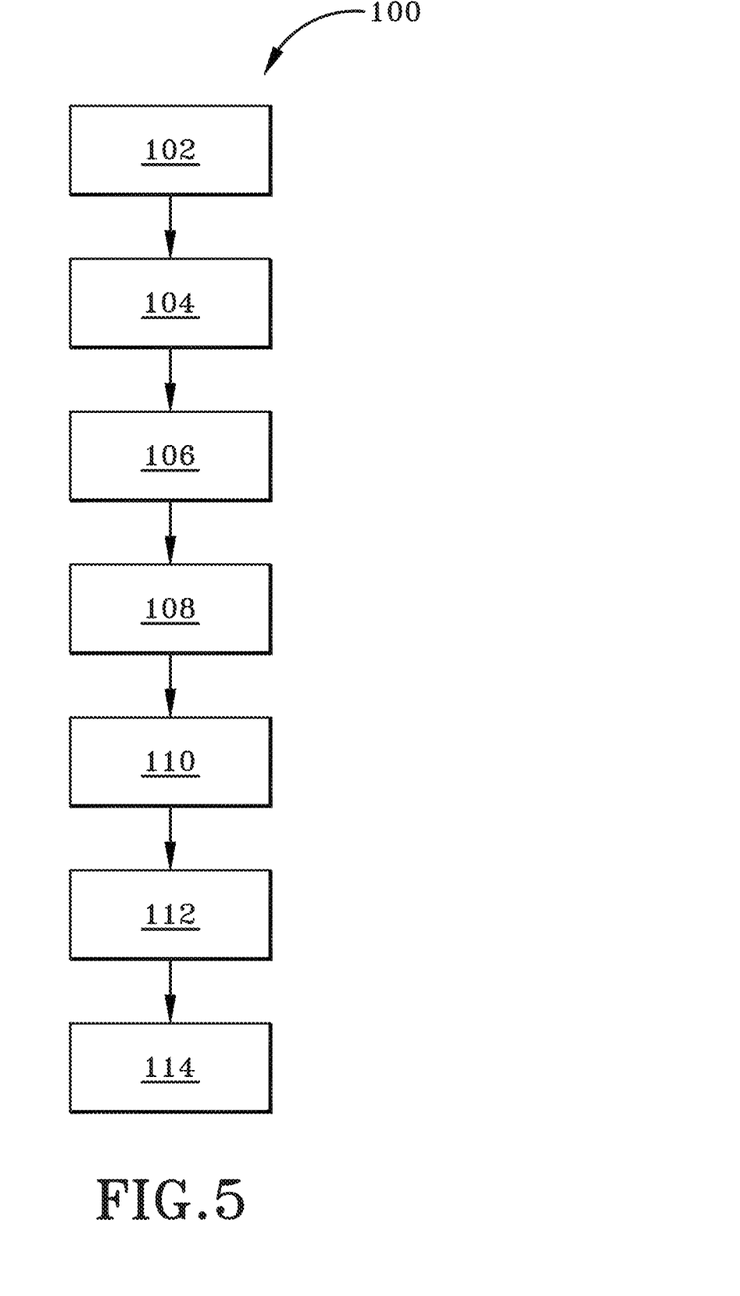
FIG. 5 is an exemplary flow chart illustrating a method of operation and use for a cognitive radio system according to one aspect of the present disclosure.

With reference to FIG. 5, an exemplary flow chart is shown illustrating an exemplary method of use for a cognitive radio system 10 with a policy component 30 implemented therein, as described above. This method is indicated generally as process 100 and may generally describe or instruct the operation of a cognitive radio system 10, having strong policy components 30, as described herein, both prior to and during an incursion into or within a theater 52. Prior to beginning a mission into a theater 52, information may be gathered about the theater 52 specifically relating to the presence of threats such as enemy receivers 42 within the mission area. This gathering of information may be done utilizing known techniques including data collected in previous missions as well as observational data and/or data gathered remotely as dictated by the desired mission parameters. This gathering of data relating to the theater 52 is generally indicated as step 102 in process 100.

Once this data has been gathered in step 102, it may be processed and provided to a cognitive radio system 10 as a series of policy constraints 30 to allow cognitive radio system 10 to reason thereover in determining a proper mission plan. This development and providing of policy component 30 to cognitive radio system 10 is shown and generally indicated as step 104 in process 100.

Now armed with this data and these policy constraints, cognitive radio system 10 may be utilized to reason over these policy constraints 30 in determining a mission plan as step 106 in process 100.

Then, as the mission is initiated in step 108, the cognitive radio system 10 may collect data in real-time as the mission progresses. For example, as a platform 18 such as aircraft 38 operates in the theater 52, the platform 18 may utilize the components of cognitive radio system 10 such as antenna 12, transceiver 14 and/or processor 16 to gather data in real-time relating to enemy receivers 42 and/or other threats within the various zones 54 of theater 52. This real-time data collection is shown and indicated as step 110 in process 100.

As this real-time data is collected, cognitive radio system 10 may utilize this data to reason over the policy component 30 in light of the newly collected data to determine if any mission parameters and/or communications protocols are in need of dynamic changes to maintain a low probability of detection and/or exploitation during mission operation. This reasoning may be performed by cognitive radio system 10 in step 112 of process 100.

If the reasoner, i.e. the strategy optimizer component 20 of cognitive radio system 10 determines that a change or adjustment to the mission plan and/or communications parameters is warranted, it may make such adjustments dynamically in real-time to modify at least one mission and/or communications parameter to maintain a low probability of detection and/or exploitation. By way of one non-limiting example, during operation of system 10 a new receiver 42 may come online which may cause strategy optimizer 20 to re-configure the timing of a communications signal, for example, to avoid detection or exploitation of that communications signal by the newly detected receiver 42. Adjusting one or more mission or communications parameters is indicated as step 114 in process 100.

While this exemplary use and method is described herein for an aircraft 38 operating in a theater 52, it will be understood that this or other similar methods may be employed using any potential vehicle or platform 18 as previously discussed herein.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is −/−0.1% of the stated value (or range of values), +/−1% of the stated value (or range of values), +/−2% of the stated value (or range of values), +/−5% of the stated value (or range of values), +1-10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A cognitive radio system comprising:
   at least one antenna in operable communication with at least one transceiver, the at least one antenna and at least one transceiver operable to receive and transmit electromagnetic signals; and
   a processor in operable communication with the at least one transceiver, the processor operable to determine and place a set of constraints on the operation of the at least one transceiver and at least one antenna according to the location of cognitive radio system relative to a remote receiver, wherein the set of constraints further comprise at least one of a transmission power constraint, a transmission direction constraint, and a transmission location constraint and wherein the set of constraints is operable to prevent at least one of detection and exploitation of the cognitive radio system by the remote receiver;
   at least one non-transitory computer readable storage medium having instructions encoded thereon that, when executed by the processor, implements operations to determine the set of constraints, the instructions comprising:
      identify at least one active receiver within a theater;
      determine a signal-to-noise ratio (SNR) wall specific to the at least one active receiver;
      calculate the spectral flux density (SFD) for the at least one active receiver; and
      determine at least one of the transmission power constraint, the transmission direction constraint, and the transmission location constraint relative to the SFD of the at least one active receiver;
      determine a SNR wall specific to each of the at least one active receivers within the theater;
      calculate the SFD for each of the at least one active receivers within the theater;
      determine at least one of the transmission power constraint, the transmission direction constraint, and the transmission location constraint relative to the SFD of each of the at least one active receivers; and
      generate a mission plan using the at least one determined constraint for each of the at least one active receivers prior to initiating a mission into the theater;
      modify at least one of the transmission power constraint, the transmission direction constraint, and the transmission location constraint for the at least one active receiver in real-time; and
      modify the mission plan in real-time according to the modification to at least one of the transmission power constraint, the transmission direction constraint, and the transmission location constraint for the at least one active receiver.

2. The cognitive radio system of claim 1 wherein the processor determines each of the transmission power constraint, the transmission direction constraint, and the transmission location constraint for each of the at least one active receivers.

3. The cognitive radio system of claim 1 wherein the mission plan includes a mission path and at least one communications node.

4. The cognitive radio system of claim 3 wherein the instructions further comprise:
generate a communications signal from a platform operating in the theater from the at least one communications node according to the at least one of the transmission power constraint, the transmission direction constraint, and the transmission location constraint.

5. The cognitive radio system of claim 1 wherein the modification of the mission plan changes at least one of a mission path and at least one communications node.

6. A method of secure communications within a contested environment comprising:
identifying at least one active receiver within a theater;
determining a signal-to-noise ratio (SNR) wall specific to the at least one active receiver;
calculating the spectral flux density (SFD) for the at least one active receiver;
determining at least one of the transmission power constraint, the transmission direction constraint, and the transmission location constraint relative to the SFD of the at least one active receiver prior to initiating a mission into the theater;
initiating the mission into the theater;
collecting data in real-time relating to the at least one active receiver;
modify at least one of the transmission power constraint, the transmission direction constraint, and the transmission location constraint for the at least one active receiver in real-time; and
modifying the mission in real-time according to the data collected;
generating a mission plan having a mission path and at least one communications node prior to initiating the mission; and
generating a communications signal from a platform operating in the theater from the at least one communications node according to the at least one of the transmission power constraint, the transmission direction constraint, and the transmission location constraint.

7. The method of claim 6 further comprising:
determining each of the transmission power constraint, the transmission direction constraint, and the transmission location constraint relative to the SFD of the at least one active receiver.

8. The method of claim 7 wherein modifying the mission further comprises:
re-calculating the SFD for the at least one active receiver according to the data collected; and
re-determining the at least one of the transmission power constraint, the transmission direction constraint, and the transmission location constraint relative to the re-calculated SFD of the at least one active receiver.

9. The method of claim 7 further comprising:
determining a signal-to-noise ratio (SNR) wall specific to each of the at least one active receivers within the theater;
calculating the SFD for each of the at least one active receivers; and
determining at least one of the transmission power constraint, the transmission direction constraint, and the transmission location constraint relative to the SFD of each of the at least one active receivers prior to initiating the mission into the theater.

10. The method of claim 9 wherein modifying the mission further comprises:
re-calculating the SFD for one or more of the at least one active receivers according to the data collected; and
re-determining the at least one of the transmission power constraint, the transmission direction constraint, and the transmission location constraint relative to the re-calculated SFD of the one or more of the at least one active receivers.

11. The method of claim 6 wherein modifying the mission further comprises:
modifying at least one of the mission path and at least one of the at least one communications node.

12. The method of claim 6 wherein modifying the mission further comprises:
modifying both of the mission path and at least one of the at least one communications node.

13. The method of claim 6 wherein modifying the mission further comprises:
re-calculating the SFD for the at least one active receiver according to the data collected;
re-determining the at least one of the transmission power constraint, the transmission direction constraint, and the transmission location constraint relative to the re-calculated SFD of the at least one active receiver; and
modifying the communications signal according to the at least one re-determined transmission power constraint, the transmission direction constraint, and the transmission location constraint.

14. A cognitive radio comprising:
at least one antenna in operable communication with at least one transceiver, the at least one antenna and at least one transceiver operable to receive and transmit electromagnetic signals; and
a processor in operable communication with the at least one transceiver, the processor having a reasoner operable to determine and place a set of constraints on the operation of the at least one transceiver and at least one antenna according to the location of cognitive radio system relative to a remote receiver and wherein the reasoner is further operable to modify the set of constraints in real-time;
wherein the set of constraints further comprise at least one of a transmission power constraint, a transmission direction constraint, and a transmission location constraint; and
wherein the reasoner is operable to modify in real-time at least one of the transmission power constraint, the transmission direction constraint, and the transmission location constraint for the at least one active receiver in real-time; and
modify the mission plan in real-time according to the modification to at least one of the transmission power constraint, the transmission direction constraint, and the transmission location constraint for the at least one active receiver.

* * * * *